L. F. GOODSPEED.
PNEUMATIC CONTROL DEVICE.
APPLICATION FILED AUG. 9, 1909.
1,004,016.
Patented Sept. 26, 1911.
2 SHEETS—SHEET 2.
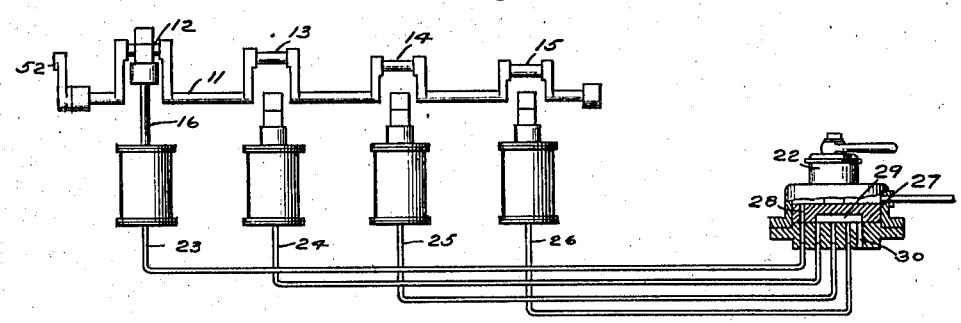
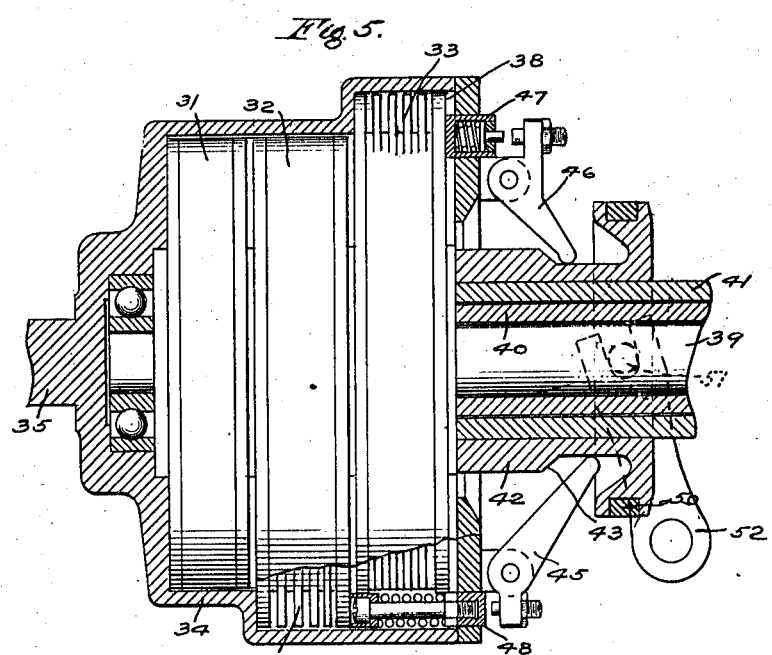
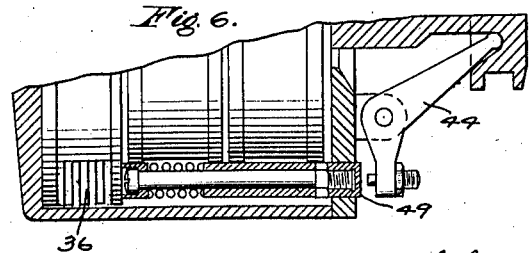
WITNESSES
Wm. M. Cady
J. C. Custer
INVENTOR
Leland F. Goodspeed
by E. Wright
Att'y.

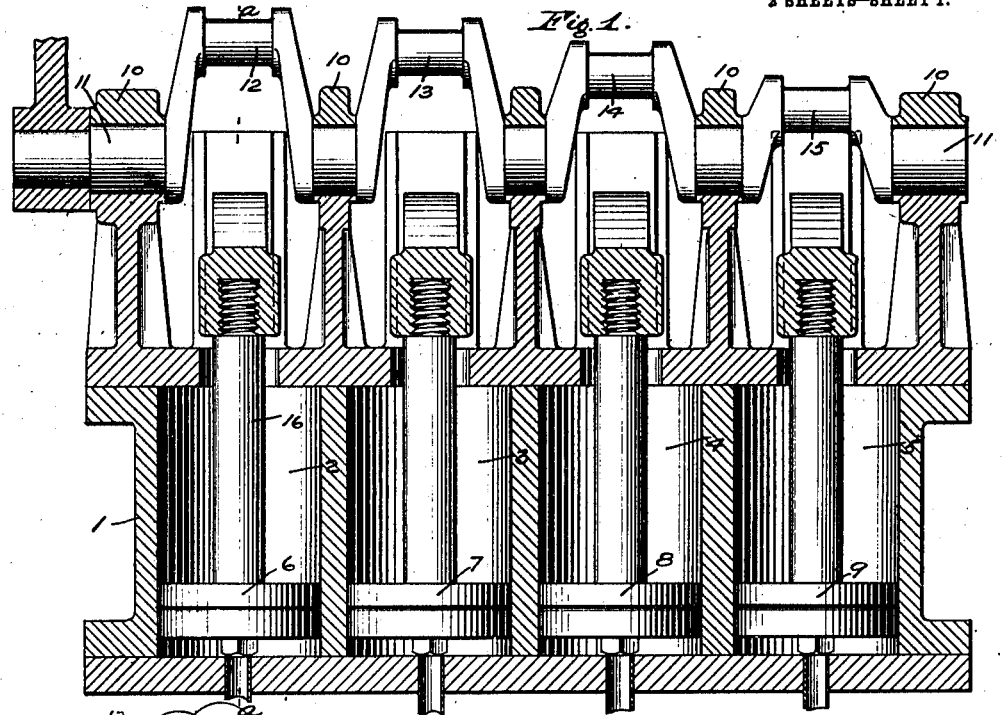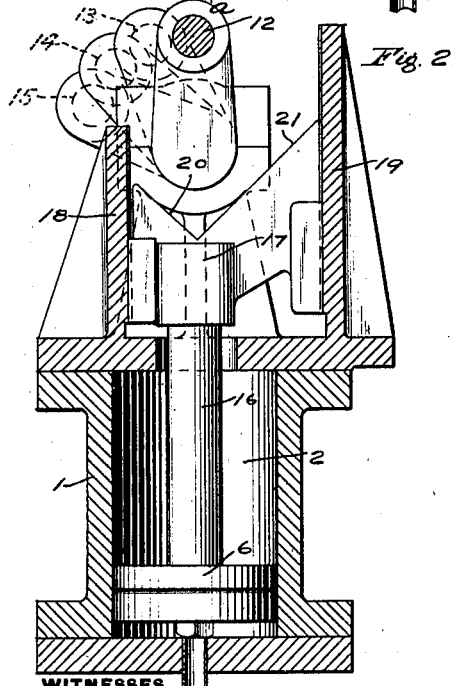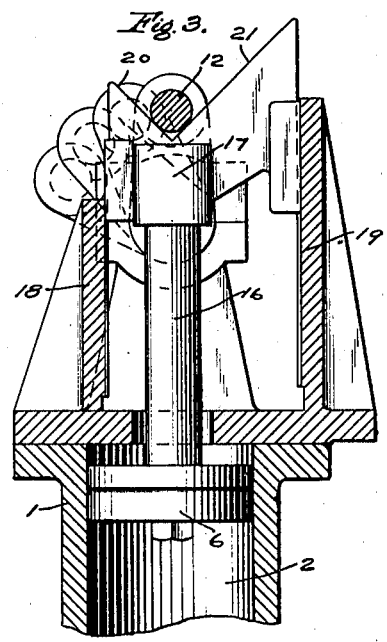

UNITED STATES PATENT OFFICE.

LELAND F. GOODSPEED, OF MILWAUKEE, WISCONSIN, ASSIGNOR OF ONE-HALF TO HENRY HERMAN WESTINGHOUSE, OF NEW YORK, N. Y.

PNEUMATIC CONTROL DEVICE.

1,004,016.  Specification of Letters Patent.  Patented Sept. 26, 1911.

Application filed August 9, 1909. Serial No. 511,853.

REISSUED

*To all whom it may concern:*

Be it known that I, LELAND F. GOODSPEED, a citizen of the United States, residing at Milwaukee, in the county of Milwaukee and State of Wisconsin, have invented new and useful Improvements in Pneumatic Control Devices, of which the following is a specification.

This invention relates to a pneumatically operated controlling device for governing the operation of a movable member adapted to control speed gear mechanisms in connection with self-propelled vehicles, multiple unit control systems, and other apparatus of like character.

My invention is more especially designed, however, for controlling the speed gear of self-propelled vehicles, such as, for example, that disclosed in my prior application, Serial No. 460,075, filed October 29, 1908.

The construction disclosed in the above mentioned application contemplates the employment of a series of clutch devices each adapted to control a speed gear mechanism, such as a high, an intermediate and a low speed gear, a controlling device being provided, the movement of which to different positions is adapted to effect the operation of a corresponding clutch device.

The main object of the present invention is to provide an improved pneumatically operated control device adapted to govern the movement to different positions of a controlling device of the above character.

Another object is to provide a pneumatic control device of this type having means for preventing operation to its different positions except in a predetermined order or sequence.

In the accompanying drawings; Figure 1 is a central sectional view of an air operated control device embodying my improvement; Fig. 2 a section taken on the line *a—a* of Fig. 1; Fig. 3 a fragmentary sectional view similar to Fig. 2 but showing the piston in engagement with the controlling member; Fig. 4 a diagrammatic view of the air operated control device connected up to a manually operated valve device for controlling the fluid pressure thereto; Fig. 5 a sectional view of a multiple clutch mechanism adapted to be operated by the control device and showing the operating mechanism for two of the clutches; and Fig. 6 a sectional view of a portion of the clutch mechanism illustrated in Fig. 5, showing the operating mechanism for the remaining clutch.

According to the construction shown in Fig. 1 of the drawings, a casing 1 is provided having a series of piston chambers 2, 3, 4, and 5 containing pistons 6, 7, 8, and 9 respectively, and journaled in suitable bearings 10 in alinement with said pistons is a crank shaft 11 provided with a series of cranks 12, 13, 14, and 15, corresponding with the respective pistons 6, 7, 8, and 9 and set at different angles, as shown in Fig. 2.

A description of one piston mechanism will suffice, as all are similarly constructed and accordingly, considering piston 6, as shown in Fig. 2, the piston stem 16 thereof is provided with a cross head 17 adapted to reciprocate between guide bearings 18 and 19 and having an inclined face 20 extending in one direction from the center line of the piston and a second inclined face 21 extending in the opposite direction. These inclined faces are adapted to engage the crank 12, and it will be seen that if the crank 12 is in a position at one side or the other of the center line of the piston 6, the corresponding inclined face will engage the crank 12 upon upward movement of the piston, thereby turning the crank shaft until the crank 12 is brought into alinement with the piston, as shown in Fig. 3.

By setting the cranks 12 to 15 inclusive to different angular positions, such as shown in Fig. 2, the operation of the pistons 6 to 9 inclusive causes the crank shaft 11 to be turned to certain definite positions according to the particular piston operated.

For controlling the fluid pressure to the pistons a manually operated valve device 22 may be provided, such as shown in Fig. 4, the respective chambers of pistons 6 to 9 inclusive having pipes 23, 24, 25, and 26 leading to the seat of the rotary valve 27 of the valve device 22.

The rotary valve 27 preferably has four positions in each of which one of the pipes leading to the pistons is supplied with fluid under pressure while the other pipes are open to the atmosphere, for instance, as shown in Fig. 4, the rotary valve 27 is shown in position with pipe 23 connected to a through port 28, so that fluid is admitted to the piston 6, while a cavity 29 in the rotary valve at the same time connects the other pipes 24, 25, and 26 with an atmospheric port 30. By turning the rotary valve 27, each of the other pipes 24, 25, and 26 may successively be supplied with fluid under pressure through port 28 while the remaining pipes are connected to the atmosphere, the cavity 29 being adapted to connect the three remaining pipes with exhaust port 30 in each position of the rotary valve. It will now be evident that the crank shaft 11 may be operated by means of the pistons 6 to 9 inclusive to assume any one of a series of definite positions.

As previously stated, my invention is more particularly designed for the purpose of controlling the speed gear of a self-propelled vehicle, such as that shown in my application hereinbefore mentioned, and in Figs. 5 and 6 of the drawings a clutch mechanism similar to that disclosed in this application is shown, comprising groups 31, 32 and 33 of interleaving disks mounted in a casing 34 secured to shaft 35. The alternate disks of each group are provided respectively with lugs 36, 37, and 38 adapted to project into corresponding pockets formed in the casing 34, so that said alternate leaves or disks of each group are compelled to rotate with the casing 34 and shaft 35. The other disks of the groups 31, 32, and 33 are secured respectively to shaft 39, sleeve 40, and sleeve 41. A slidable cam sleeve 42 is mounted on sleeve 41 and is provided with a cam surface 43 adapted to engage and operate fingers 44, 45, and 46. These fingers are of such length that upon outward movement of the cam sleeve 42, the fingers 46 first engage the cam surface 43, the fingers 45 upon a further movement, and the fingers 44 last. The rocking of fingers 46 by the cam surface 43 causes the same to exert a pressure on plugs 47 which are adapted to transmit the pressure to the group of disks 33 so that the disks connected to sleeve 41 are frictionally driven by the disks of groups 33 which rotate with the casing 34. Similarly, plugs 48 and 49 serve to transmit pressure to the groups of disks 32 and 31 respectively and thereby operate the corresponding sleeve 40 and the shaft 39.

The cam sleeve 42 is provided with a rotatably mounted ring 50 having pins 51 adapted to be engaged by the bifurcated end of a lever 52 mounted on the shaft 11. The position of parts shown in Fig. 5 is the off position, the piston 6 being operated to shift the crank 12 for this position. By turning the rotary valve 27 to the position following that shown in Fig. 4, air is admitted to pipe 24, while the other pipes are connected to the atmosphere. The crank 13 is then shifted to aline with its piston 7 and the shaft 11 is turned an amount sufficient to cause the fingers 46 to ride up the cam surface 43 and thereby cause the clutch group 33 to be thrown in for operating the low speed gear. The intermediate speed gear is connected up in the next position of the rotary valve, which admits air to piston 8 and causes through the turning of shaft 11, the further movement of the cam sleeve 42 and the operation of clutch groups 32, while the high speed gear is connected up by operation of piston 9 and clutch group 31. As shown, the pistons are returned by gravity to their inactive positions when not under air pressure, but if desired, springs may be disposed within the piston cylinders to act on the pistons and assist the movement of same to their inactive positions.

It will now be apparent that with my invention the controlling device may be shifted to different definite positions. It will also be noted that the inclined faces 20 are of limited extent with respect to the cranks so that only a crank immediately succeeding one previously operated can be actuated, and consequently if an attempt should be made to throw in the high gear, for instance, before the intermediate or low gear, the corresponding crank would not be in a position near enough to the center line of the piston so that the inclined face could engage it. Thus means are provided to insure a gradual speeding up of the vehicle so that possible injury to the high speed gear due to a sudden connection thereof is prevented. The opposite inclined faces, however, extend out farther so that in the movement to throw out the speed gear clutches the operating member or shaft 11 may be instantly returned to off position from any one of the other positions, even the extreme high speed position, as the long incline of the high speed controlling piston permits of shifting the controlling shaft from high speed position directly to the low speed position, as will be evident.

Though the invention has been designed more particularly for controlling the speed gear mechanism of a self-propelled vehicle, the invention may be employed for various other purposes, such as multiple unit control systems and the like.

Having now described my invention, what I claim as new and desire to secure by Letters Patent, is:—

1. An air operated control device comprising a movable controlling member having a plurality of operating positions, a plurality of pistons each adapted to operatively engage said member and each operated by fluid under pressure for shifting said member to one of its operating positions independently of the other pistons.

2. An air operated control device comprising a controlling member and pistons operated by fluid under pressure for shifting said controlling member, one piston being adapted to shift said controlling member to one position and another piston to another position and each piston operating independently of the other pistons.

3. In a self-propelled vehicle, the combination with a plurality of clutch devices for controlling the speed gear and a controlling member for operating said clutch devices, of a plurality of pistons each operated by fluid under pressure for shifting said controlling member to a position for throwing in one of said clutch devices the movement of each piston being limited by the position of the controlling member.

4. An air operated control device comprising a shaft provided with a plurality of cranks set at different angles and a plurality of pistons, each operated by fluid under pressure for engaging one of the cranks to thereby turn the shaft to one of a series of different predetermined positions.

5. An air operated control device comprising a shaft provided with a crank and a piston operated by fluid under pressure and carrying inclined faces adapted to engage said crank and thereby turn the shaft to a certain position.

6. An air operated control device comprising a shaft provided with a crank and a piston operated by fluid under pressure and carrying inclined faces adapted to engage said crank and turn same into a position of alinement with the piston, thereby turning the shaft to a predetermined position.

7. In a self-propelled vehicle, the combination with a clutch device adapted to be connected to a high, an intermediate, and a low speed gear mechanism, and an operating device having an off position and three other positions in which a corresponding speed gear mechanism is adapted to be thrown in, of a plurality of pistons operated by fluid under pressure for shifting said operating device to each of its respective positions.

8. A pneumatic control device comprising a controlling member having a plurality of operating positions, a plurality of pneumatically operated pistons each adapted to shift said controlling member to one of its positions, and means for rendering the operation of a piston ineffective unless the controlling member is in a predetermined position.

9. A pneumatic control device comprising a controlling member having a plurality of operating positions, a plurality of pneumatically operated pistons each adapted to shift said controlling member to one of its positions, and means for rendering the operation of a piston ineffective to shift the controlling member unless said controlling member is in a certain position.

10. A pneumatic control device comprising a controlling member having a plurality of operating positions, a plurality of pneumatically operated pistons each adapted to shift said controlling member to one of its positions, and means for limiting the operation of the pistons to a predetermined sequence or order in one direction and for permitting the operation in the opposite direction without regard to sequence.

11. A pneumatic control device comprising a controlling shaft provided with a crank, a fluid pressure operated piston, and a head operated by said piston and having an inclined face adapted to engage the crank for actuating the same.

12. A pneumatic control device comprising a controlling shaft provided with a crank, a fluid pressure operated piston, and a head operated by said piston and having oppositely inclined faces for engaging and thereby actuating said crank.

13. A pneumatic control device comprising a controlling shaft provided with a crank, a fluid pressure operated piston, and a head operated by said piston and having oppositely inclined faces for engaging said crank to effect the angular movement thereof in opposite directions, one inclined face being of greater extent than the other to permit the actuation of said crank through a greater angle.

14. A pneumatic control device comprising a controlling shaft provided with a series of cranks disposed at different angles, pneumatically operated pistons each provided with a head having an inclined face adapted to engage and operate one of said cranks, an inclined face of a head being adapted to operatively engage the corresponding crank only when within a certain range of movement.

15. A pneumatic control device comprising a controlling shaft provided with a series of cranks disposed at different angles, pneumatically operated pistons each provided with a head having an inclined face adapted to engage and operate one of said cranks, the inclined face of each head being so limited in extent as to prevent operation of the corresponding crank unless turned to a predetermined position.

In testimony whereof I have hereunto set my hand.

LELAND F. GOODSPEED.

Witnesses:
A. M. CLEMENTS,
WM. M. CADY.